(12) United States Patent
Daverman et al.

(10) Patent No.: US 9,477,342 B2
(45) Date of Patent: Oct. 25, 2016

(54) MULTI-TOUCH FORCE SENSING TOUCH-SCREEN DEVICES AND METHODS

(75) Inventors: Dodge Daverman, Chicago, IL (US); Michael Olley, Lake Zurich, IL (US)

(73) Assignee: Google Technology Holdings LLC, Mountain View, CA (US)

(*) Notice: Subject to any disclaimer, the term of this patent is extended or adjusted under 35 U.S.C. 154(b) by 621 days.

(21) Appl. No.: 12/198,237

(22) Filed: Aug. 26, 2008

(65) Prior Publication Data
US 2010/0053116 A1    Mar. 4, 2010

(51) Int. Cl.
*G06F 3/041*    (2006.01)

(52) U.S. Cl.
CPC .................. *G06F 3/0414* (2013.01)

(58) Field of Classification Search
CPC .. G06F 3/0488; G06F 3/04883; G06F 3/044; G06F 3/045; G06F 3/0412; G06F 3/03545; G06F 3/041; G06F 3/04886; G06F 3/0414; G06F 3/0418; G06F 2203/04104; G06F 2203/04105; G06F 2203/04106
USPC ......... 178/18.01, 18.02, 18.06; 345/173–178
See application file for complete search history.

(56) References Cited

U.S. PATENT DOCUMENTS

| | | | |
|---|---|---|---|
| 5,038,142 A | 8/1991 | Flowers et al. | |
| 5,510,813 A | 4/1996 | Makinwa et al. | |
| 6,492,979 B1 | 12/2002 | Kent et al. | |
| 6,504,530 B1 | 1/2003 | Wilson et al. | |
| 6,762,752 B2 | 7/2004 | Perski et al. | |
| 6,819,312 B2 | 11/2004 | Fish | |
| 6,943,779 B2 * | 9/2005 | Satoh | 345/173 |
| 7,106,222 B2 | 9/2006 | Ward et al. | |
| 7,129,854 B2 | 10/2006 | Arneson et al. | |
| 7,331,245 B2 | 2/2008 | Nishimura et al. | |
| 7,784,366 B2 | 8/2010 | Daverman et al. | |

(Continued)

FOREIGN PATENT DOCUMENTS

| | | |
|---|---|---|
| JP | 2004-518188 A | 6/2004 |
| KR | 10-2008-0014841 A | 2/2008 |

(Continued)

OTHER PUBLICATIONS

F-Origin, zTouchTM 3.0 Product Information, Version 1.2; 2007, 1 page.

(Continued)

*Primary Examiner* — Stephen Sherman
*Assistant Examiner* — Aaron Midkiff
(74) *Attorney, Agent, or Firm* — Brake Hughes Bellermann LLP

(57) ABSTRACT

Described are methods and devices including a touch sensor layer configured to receive touch input and a force sensor layer stacked with the touch sensor layer, the force sensor layer includes an array of force sensors configured to receive force input. The force sensor array includes individual force sensors. Specific sensors of the disclosed force sensor array are associated with specific locations of the touch screen to add information that can be used to decipher which key is actually being pressed and may avoid falsing. Both a touch signal and a force signal are utilized to determine the validity of a user touch input. In one embodiment each force sensor may operate independently of the others. Particular embodiments are described that utilize a coarse grid to determine valid touch inputs and that make a determination of a centroid location based on a plurality of force sensors to determine valid touch inputs.

14 Claims, 4 Drawing Sheets

(56) References Cited

U.S. PATENT DOCUMENTS

| | | |
|---|---|---|
| 2003/0085882 A1 | 5/2003 | Lu |
| 2006/0197752 A1* | 9/2006 | Hurst et al. .................. 345/173 |
| 2007/0229464 A1 | 10/2007 | Hotelling et al. |
| 2008/0007434 A1* | 1/2008 | Hristov .......................... 341/22 |

FOREIGN PATENT DOCUMENTS

| | | |
|---|---|---|
| WO | 02/35461 A1 | 5/2002 |
| WO | 0235461 A1 | 5/2002 |
| WO | 2006/133018 A2 | 12/2006 |
| WO | 2006133018 A2 | 12/2006 |
| WO | 2007146780 A2 | 12/2007 |
| WO | 2007146783 A2 | 12/2007 |
| WO | 2009042422 A2 | 4/2009 |

OTHER PUBLICATIONS

Office Action for Korean Patent Application No. 10-2013-7009141, mailed on Oct. 23, 2014, 8 pages.
Office Action Received for European Patent Application No. 09791130.9, mailed on Apr. 21, 2015, 7 pages.
Notice of Final Rejection for KR Application No. 10-2013-7009141, mailed Aug. 31, 2015, 6 pages.
Patent Cooperation Treaty, International Search Report and Written Opinion of the International Searching Authority for International Application No. PCT/US2009/052654, Aug. 4, 2009, 12 pages.
Final Office Action for Korean Patent Application No. KR10-2013-7009141, mailed on Dec. 29, 2015, 6 pages.
First Examination Report for Indian Patent Application No. 447/KOLNP-2011, mailed on Mar. 17, 2016, 2 pages.

* cited by examiner

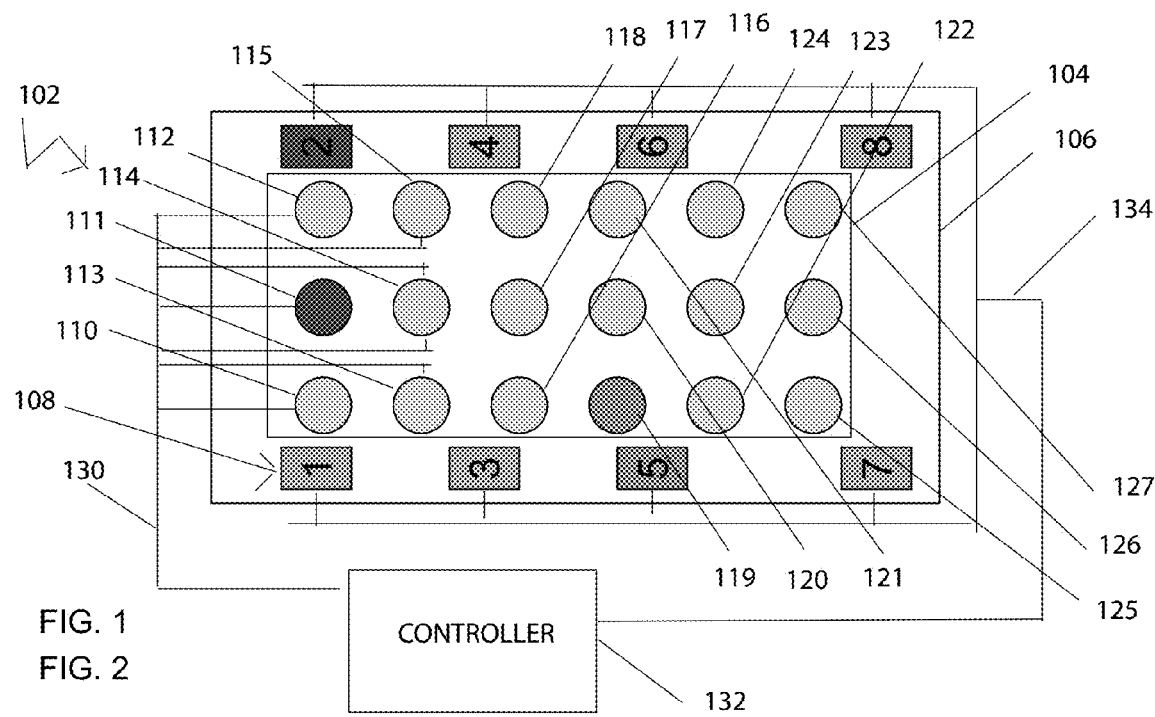
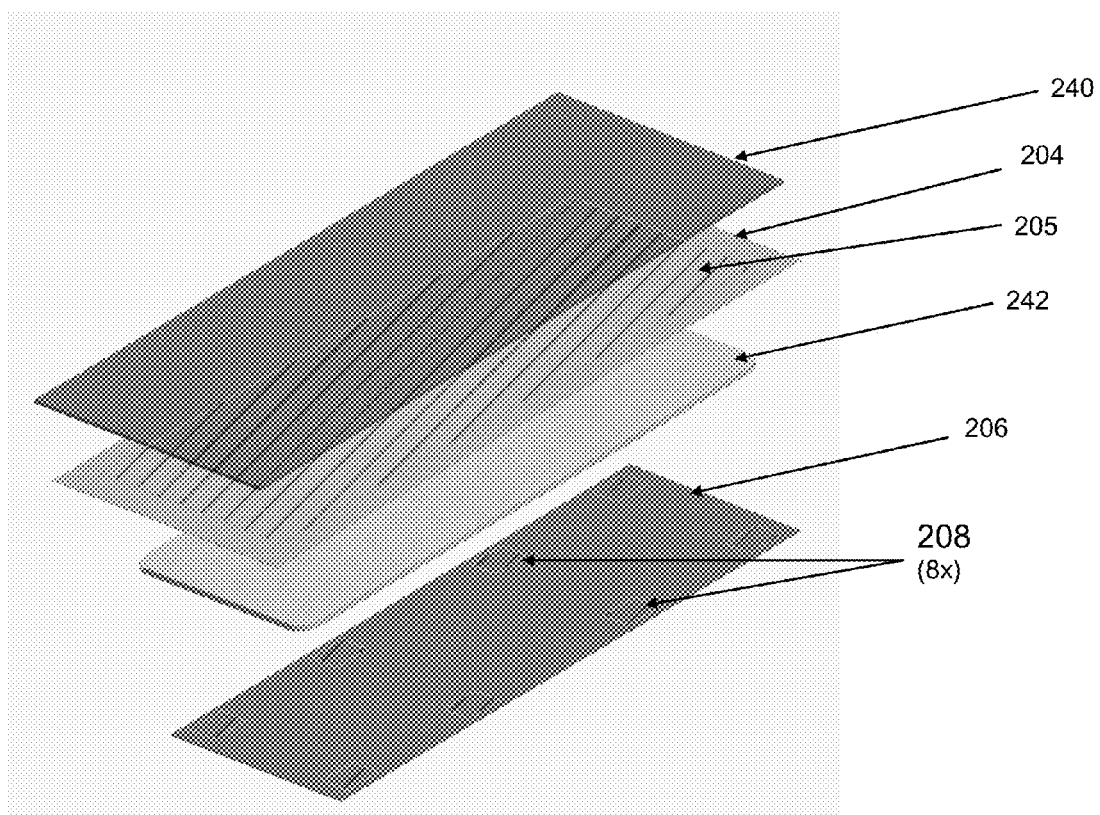
FIG. 1
FIG. 2

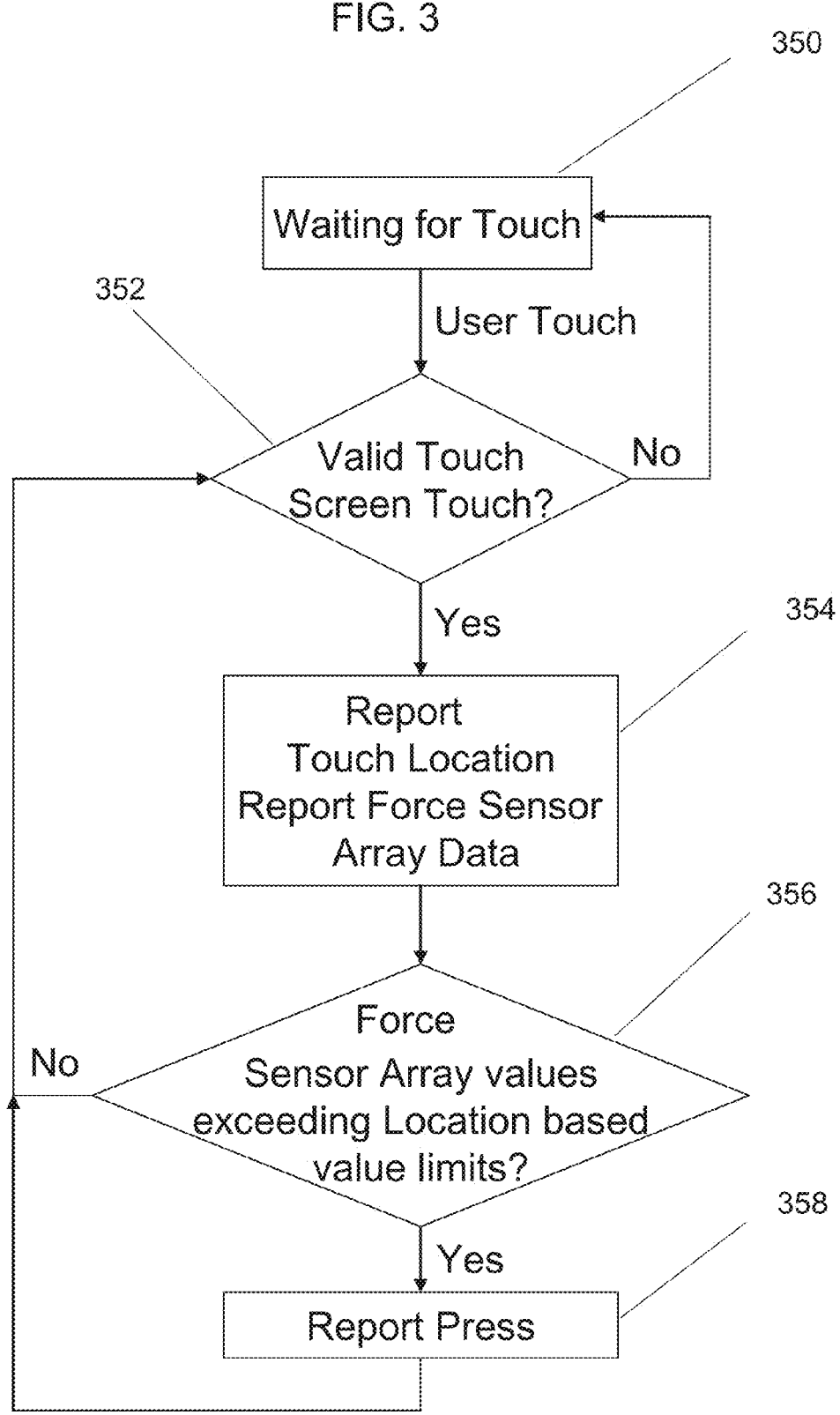

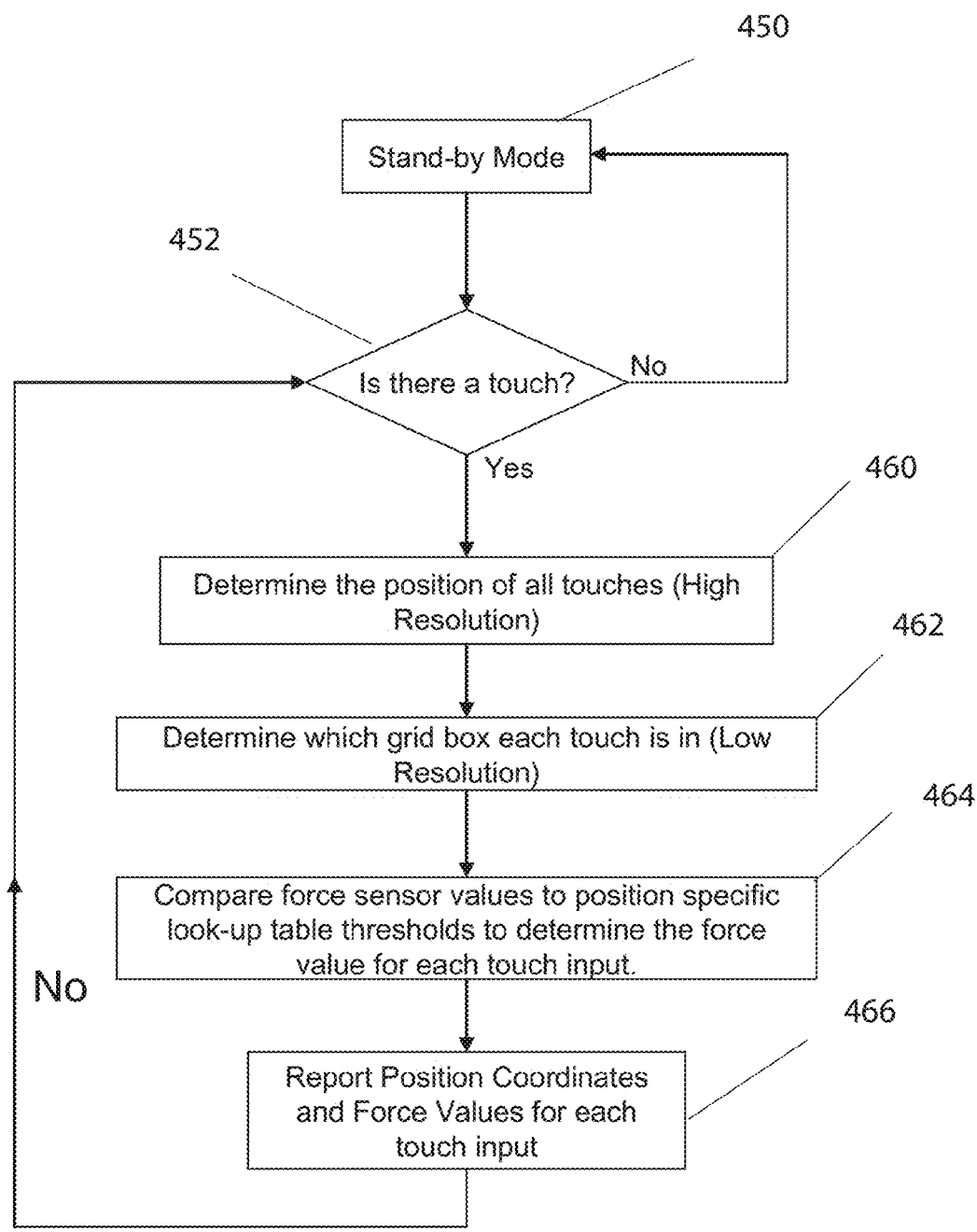

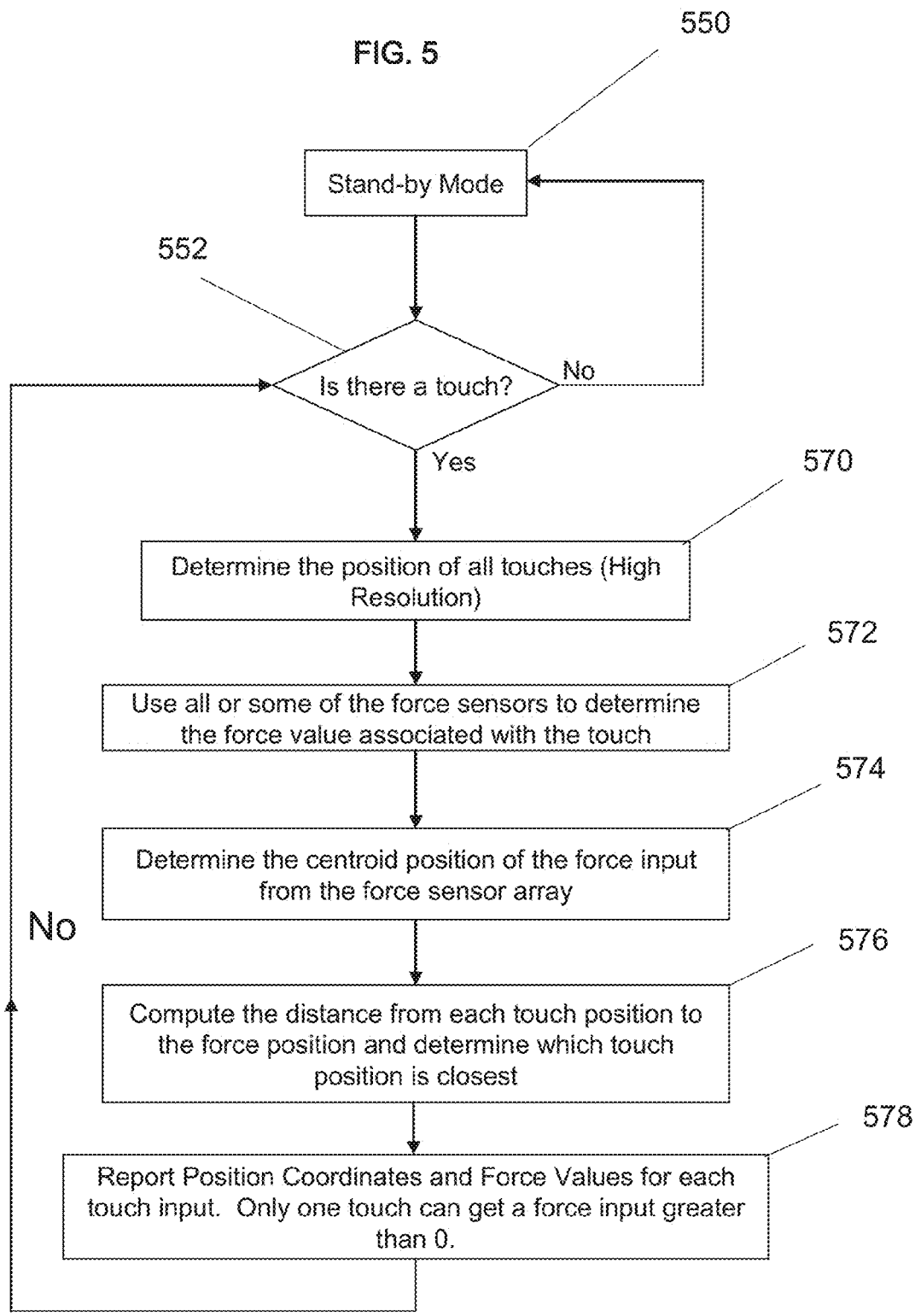

MULTI-TOUCH FORCE SENSING TOUCH-SCREEN DEVICES AND METHODS

FIELD

Disclosed are devices and methods for multi-touch force sensing touch-screens, and in particular, a user input system including a touch sensor layer configured to receive touch input and a force sensor layer stacked with the touch sensor layer, the force sensor layer including an array of force sensors configured to receive force input, both of which being utilized in cooperation to determine position and force information about a user's input.

BACKGROUND

Touch screens with multi-touch capability are in high demand, particularly due to the expanding functionality of small devices such as mobile communication devices. For example, cellular telephones include features such as still and video cameras, video streaming and two-way video calling, email functionality, Internet browsers, music players, FM radios with stereo audio and organizers. Mobile commerce, facilitated generally by mobile phones, can include services such as banking, payment, and ticketing. The emerging technology behind m-commerce may transform the mobile communication device into an electronic wallet. Cellular telephones in particular are becoming more than simple mobile communication devices. They are evolving into powerful tools for information management as well as entertainment consoles.

Touch screens may be utilized for providing user input for many of the functionalities of mobile communication devices on which the touch screens may be small. Due to their size and the manner in which they are held by a user providing user input to small devices with touch screens, errors may be introduced in differentiating gestural inputs by the user. Rapid entry of user input to the touch screen, particularly in a two-handed mode, may cause falsing. That is, a user may inadvertently press two keys of the touch screen substantially simultaneously. Such may be particular the case where the touch screen provides a QWERTY keypad and a user uses two-handed text entry. Were a user to press two keys when the user intended to press one key, a device may attempt to differentiate which touch to recognize as a valid touch input, for example, in accordance with predictive software methods. In other devices, a key entry may be validated upon user input lifting off the touch screen.

BRIEF DESCRIPTION OF THE DRAWINGS

FIG. 1 depicts a multi-touch user input system including both a touch sensor layer configured to receive touch input and a force sensor layer stacked with the touch sensor layer to receive force input;

FIG. 2 depicts a stack of layers that includes both the touch layer and the force layer as discussed above as well as a display module;

FIG. 3 is a flow chart depicting an embodiment of a method where both the touch input signal and the force sensor array data are utilized to determine the location of a press on at a touch screen and the force associated with that touch location;

FIG. 4 is a flow chart depicting another embodiment of a method where the touch sensor of layer is assumed to be divided into a coarse grid relative to the touch sensor resolution to reduce the memory required to process the next steps and is capable of sensing the position of multiple inputs;

FIG. 5 is a flow chart depicting another embodiment of a method where the touch sensor layer is capable of sensing the position of multiple touch inputs and in this particular embodiment a method of processing the data sensed on the array of force sensors to form a single force value and location associated with the touchscreen that is used to determine which touch input is associated with the force value by determining the closest touch location to computed force location.

DETAILED DESCRIPTION

A force sensor may provide an added dimension to a touch screen to help determine the location of intended user input on the touch screen. The added dimension of the force sensor to the touchscreen system provides an extra dimension of force, which may be useful to create a user experience that is more like that of a traditional popple based keypad. For example, a force sensor would allow the select function to occur when a user input exceeds a specified force threshold. The force sensor provides an associated force value with each touch location that is sensed by the touchscreen sensor.

When the input surface of a touch screen is substantially rigid, a single force sensor may only be able to take into account relative displacement of the input surface in response to a single force input. A single force sensor will sense the total force associated with any number of user force inputs, but will not be able to differentiate how much force is associated with each user input. A single force sensor will sense the total force associated with any number of user force inputs, but will not be able to differentiate how much force is associated with each user input. However, with two force inputs to a single force sensor, the intended user input determined in accordance with the single force sensor may be inaccurate. For example in a QWERTY touch screen keypad, were a user to press two keys when the user intended to press one key, a single force sensor may not overcome the associated falsing. A single force sensor will sense the total force associated with any number of user force inputs, but will not be able to differentiate how much force is associated with each user input.

Described are methods and devices including both a touch sensor layer configured to receive touch input and a force sensor layer stacked with the touch sensor layer, where the force sensor layer may include an array of force sensors configured to receive force input. The force sensor array includes individual force sensors. Different locations on the touch screen area are associated with specific force sensors in the array. In one embodiment each force sensor of the force sensor array may operate independently of the others. Other particular embodiments are described. For example, in one embodiment that defines the touch screen as a coarse grid where a grid portion may be associated with at least one sensor in the array to determine valid touch inputs. In another embodiment, a determination of a centroid location may be made based on a plurality of force sensors to determine valid touch inputs. The "centroid location" is a single location that is associated with a single force input as computed by combining the different values on some or all of the sensors in the force sensor array.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts a multi-touch user input system 102 including both a touch sensor layer 104 configured to receive touch input and a force sensor layer 106 stacked with the touch sensor layer 104 to receive force input. The force sensor layer 104 is depicted as including an array 108 of force sensors, 1, 2, 3, 4, 5, 6, 7, and 8 each of which configured to receive force input, either individually, or in a collective manner as will be describe below. It is understood that the array 108 may include any suitable number of force sensors. In the depicted embodiment, the force sensor array 108 includes individual force sensors 1, 2, 3, 4, 5, 6, 7, and 8 for monitoring the force applied to specific regions, portions or locations of the touch sensor layer 104.

The depicted touch sensor layer 104 has eighteen touch locations, 110, 111, 112, 113, 114, 115, 116, 117, 118, 119, 120, 121, 122, 123, 124, 125, 126, and 127. A portion of a circuit 130 of the touch locations in communication with a controller 132 is depicted. Also, a portion of a circuit 134 of the array 108 of force sensors in communication with a controller 132 is depicted. The controller 132 may receive touch input and force input from a user input to the touch screen, and determine from both, via different methods discussed below, whether the touch input was intended. The controller 132 may be in communication with modules that provide instructions to the controller, and a memory for data such as look up tables, on which to base certain calculations.

The touch sensor layer 104 may have a location, such as location 111 that may be associated with at least one force sensor of the array 108, such as force sensor 2. In another example, the touch sensor layer 104 may have a location, such as location 119 that may be associated with at least one force sensor of the array 108, such as force sensor 5. It is understood that any suitable arrangement of touch locations in a multi-touch environment are with the scope of this discussion. Furthermore, as will be discussed in more detail below, any suitable correlation between touch sensor locations and force sensors of a force sensor array 108 is within the scope of this discussion. An assignment of force sensors of the force sensor array 108 may be made to one or more locations the touch screen. Moreover, the assignment of force sensors to location of the touch screen may be dynamically arranged based on the functionality of the device at the time.

A force value calculation based on input at a force sensor may be made in accordance with one or more associated touch inputs to one or more touch screen locations. Calculations made by the controller 132 utilizing a force value or values determined by force signals of the disclosed array 108 of force sensors may differentiate which touch layer location, or key is pressed in a multi-touch environment and may avoid falsing in the event that two locations on the touch screen are pressed substantially simultaneously. A user may inadvertently press two keys of the touch screen substantially simultaneously. For example, were a user to press location 110 and 111, but the force sensor 2 generated a force value commensurate with a press to location 111 the controller may make a determination that location 111 was the intended key press.

That is, specific force sensors of the disclosed force sensor array 108 are associated with specific locations of the touch screen to add information that can be used to decipher which key is actually being pressed. If two or more keys are pressed simultaneously, the disclosed methods and devices may provide, in addition to the touch screen sensor, for the detection of the intended user input.

In accordance with the disclosed methods and devices, user input may include both a touch input to the touch sensor layer 104 and a force input to the force sensor layer 106. The controller 132 may be configured to receive at least one touch signal correlated to at least one touch input from the touch sensor layer 104 and configured to receive a force signal correlated to force input from the force sensor layer 106 and wherein the controller 132 is further configured to process both signals, first processing the touch signal and then to subsequently processing the force signal. From the user input to the touch layer 104, utilizing both a touch signal and a force signal rapid entry of user input to the touch screen, particularly in a two-handed mode, that may otherwise cause falsing, may be reconciled in a number of different manners as described below. For example, each force sensor of the force sensor array 108 may operate independently of the others, or the two or more force sensors of the array 108 of force sensors may operate together.

FIG. 2 depicts a stack of layers that includes both the touch layer and the force layer as discussed above as well as a display module. By incorporating the touch layer and the force layer into a stack with a display module, the user input system may change depending upon the functionality of the device at the time. A glass lens 240 may be adjacent the touch sensor layer 204 which may include touch sensor active area 205. The display module 242 may be incorporated into the user system having a active viewing area. At least a portion of the array 208 of force sensors of the force sensor layer 206 may be outside the active viewing area of the display module. Accordingly, in this way the array 208 of force sensors may not be visible through the active area of the display.

In the embodiment that is the same as or similar to that of the system depicted in FIG. 2, each touch to the touch sensor layer 204 may be associated with an x and y coordinate, that is a touch position or touch location, as well as a force value associated with it. The touch sensor 204 may generate a touch signal to report a user input of a touch to a higher level system, such as the controller 132 (see FIG. 1), that may make determinations based on the reported touch positions and generate force values for different touch inputs. The reported force value may be binary, such as pressed or unpressed, or it can be of a higher resolution indicating degrees of applied force. The embodiment of the system depicted in FIG. 2 may be utilized to both improve actuation force uniformity as well as to aid in determining the force values associated with multiple touch inputs.

FIG. 3 is a flow chart depicting an embodiment of a method depicting that both the touch input signal and the force sensor array data are utilized to determine the location of a press on at a touch screen location. The touch sensor active area 205 may be activated and waiting for touch input 350. A user may provide touch input so that it may be determined at the touch sensor level whether that touch was a valid touch to the touch screen 352. If not, then the process returns to a waiting mode 350. If the touch is determined valid at the touch screen 352, the location of the touch is reported as the force sensor array data 354, for example, to the controller 132 (see FIG. 1). The determination 356 that the force sensor array value exceeds location based value limits may be made to determine if the touch at a particular location on the touch screen 352 whether the touch input has exceeded its force threshold. That is, the controller may be configured to process a force signal to determine a force value for a user input in accordance with the location of user input to the touch sensor layer as determined from processing a touch signal. The controller may be further configured to determine multiple user inputs received by the touch sensor layer and to determine one or more locations of multiple user inputs and their associated force values. In this way a press to a particular location on the touch sensor lay may be determined and reported to validate the touch 358.

FIG. 4 is a flow chart depicting another embodiment of a method where the touch sensor of layer is assumed to be divided into a coarse grid relative to the touch sensor resolution to reduce the memory required to process the next steps and is capable of sensing the position of multiple inputs. Each position of the grid may have a set of force sensor thresholds associated with it. The thresholds may be stored in a memory. In yet another embodiment, force sensor thresholds may be associated with a combination of multi-touch grid boxes. Various forms of logic can be applied to determine the force values based on different force sensor values for each location of the touch sensor grid.

FIG. 4 depicts that the touch sensor active area 205 may be activated and waiting for touch input 450. A user may provide touch input so that it may be determined at the touch sensor level whether that touch was a valid touch to the touch screen 452. If not, then the process returns to a waiting mode 450. If the touch is determined valid at the touch screen 42, the position of all the touches based on the high resolution capability of the touch sensor 205 is determined 460, for example, by the controller 132 (see FIG. 1). A determination as to which grid location each touch is based upon the above-discussed low resolution may be determined 462, for example, by the controller 132. Force values may be determined that correlate to the touch in the low resolution grid location so that they may be compared 464 to forces sensor values related to position specific look-up table thresholds to determine the force value for each touch input. The determination 456 that the force sensor array value exceeds location based value limits may be made to determine if the touch at a particular location on the touch screen 452 is a valid touch. That is, the controller may be configured to process a force signal to determine a force value for a user input in accordance with the location of user input to the touch sensor layer as determined from processing a touch signal. The controller may be further configured to determine multiple user inputs received by the touch sensor layer and to determine one or more locations of multiple user inputs and their associated force values. In this way a press to particular coordinates or locations on the touch sensor and the force values for each touch input may be determined and reported to validate the touch 466.

FIG. 5 is a flow chart depicting another embodiment of a method where the touch sensor layer is capable of sensing the position of multiple inputs and in this particular embodiment a method of characterizing force inputs to form a coordinate representing the centroid of force inputs to determine the closest touch screen location to receive touch input. The "centroid location" is a single location that is associated with a single force input as computed by combining the different values on some or all of the sensors in the force sensor array.

FIG. 5 depicts that the touch sensor active area 205 (see FIG. 2) may be activated and waiting for touch input 550. A user may provide touch input so that it may be determined at the touch sensor level whether that touch was a valid touch to the touch screen 552. If not, then the process returns to a waiting mode 550. If the touch is determined valid at the touch screen 552, a low resolution position of all the touches may be determined 570 by the force sensor array 208, for example, by the controller 132 (see FIG. 1). The process may use one, some or all of the force sensors of the array 208 to determine a force value associated with the touch. When two or more force sensors are used a centroid position of the force input from the force sensor array 208 may be determined 574. A computation of the distance from some or all of the touch positions to the force position may be made to determine which touch position is the closest 576. In this way a press to particular coordinates or locations on the touch sensor 204 and the force values for each touch input may be determined and reported to validate the touch 578. In this way, one touch may receive a force input greater than zero.

Accordingly, in the above-described centroid method, the individual force value seen by each affected force sensor in the array 208 (see FIG. 2) and the magnitude of that force value may be used to determine which touch input is applying the force by selecting the touch location that is closest to the force centroid location. Moreover, there may be ways to improve the uniformity of actuation force across the touch screen by using the total force value computed from some or all the values of the force sensors to determine when a touch input was made or when a key was press. For example, as soon as a total value exceeds a pre-set threshold, a key press may be recognized and then a determination of which location on the touch screen was pressed by finding the touch input closest to the centroid force input.

In the above-described methods and devices a force sensor provides an added dimension to a touch screen to help determine the location of intended user input on the touch screen. The described are methods and devices include utilizing both a touch sensor layer configured to receive touch input and a force sensor layer stacked with the touch sensor layer, where the force sensor layer may include an array of force sensors configured to receive force input. The force sensor array includes individual force sensors. Specific force sensors of the disclosed force sensor array are associated with specific locations of the touch screen to add information that can be used to decipher which key is actually being pressed to avoid falsing. Both a touch signal and a force signal are utilized to determine the validity of a user touch input. In one embodiment each force sensor of the force sensor array may operate independently of the others. Other particular embodiments are described. For example, in one embodiment that defines the touch screen as a coarse grid where a grid portion may be associated with at least one sensor in the array to determine valid touch inputs. In another embodiment, a determination of a centroid location may be made based on a plurality of force sensors to determine valid touch inputs.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A user input system, comprising:
a touch sensor layer configured to receive touch inputs of a user on a touch screen, wherein the touch screen includes multiple items;
a force sensor layer, including an array of force sensors, with each of the force sensors configured to receive force inputs; and
a controller configured to:
receive a touch input received on the touch sensor layer, wherein the touch input is simultaneously received on at least two of the multiple items on the touch screen,
receive multiple force inputs from the force sensor layer with each force input being from a different one of the multiple force sensors,
generate a force value for each of the received force inputs, wherein the generated force values are each associated with a corresponding one of the force sensors,
compute a centroid location using the generated force values, wherein the centroid location is a single location that is associated with the generated force values from multiple force sensors, and
calculate a distance from each of the multiple items on the touch screen to the centroid location to validate one of the multiple items as an intended touch.

2. The system of claim 1 wherein the touch sensor layer has an area wherein a location is associated with a portion of the area of the touch sensor layer, and wherein at least one force sensor is associated with at least one location of the touch sensor layer.

3. The system of claim 2 wherein the controller is further configured to process a single force input to determine a force value for a touch input in accordance with the location of user input to the touch sensor layer as determined from processing the touch input.

4. The system of claim 1, further comprising:
a display module having an active viewing area, the display module stacked with the touch sensor layer and the force sensor layer.

5. The system of claim 4 wherein at least a portion of the array of force sensors is outside the active viewing area of the display module.

6. The system of claim 1 wherein the touch sensor layer has a resolution and wherein the touch sensor layer is divided into grid portions such that a grid portion of the touch sensor is associated with at least one force sensor in a force sensor array, wherein the grid of the touch sensor layer has a higher resolution than a grid of the force sensor layer.

7. The system of claim 1, wherein the controller is further configured to determine which sensors of the array of force sensors received force input so as to generate the force values for the sensors that received force input.

8. The system of claim 1 wherein the multiple items include multiple keys.

9. The system of claim 8 wherein the multiple keys include multiple virtual keys displayed on the touch screen.

10. A method of a user input system including a touch sensor layer and a force sensor layer including an array of force sensors, the method comprising:
receiving touch input from the touch sensor layer on a touch screen, wherein the touch screen includes multiple items;
receiving force inputs from the force sensor layer;
receiving a touch input received on the touch sensor layer, wherein the touch input is simultaneously received on at least two of the multiple items on the touch screen;
receiving multiple force inputs from the force sensor layer with each force input being from a different one of the multiple force sensors;
generating a force value for each of the received force inputs, wherein the generated force values are each associated with a corresponding one of the force sensors;
computing a centroid location using the generated force values, wherein the centroid location is a single location that is associated with the generated force values from multiple force sensors; and
calculating a distance from each of the multiple items on the touch screen to the centroid location to validate one of the multiple items as an intended touch.

11. The method of claim 10 wherein the touch screen includes an area which includes a plurality of touch screen locations and wherein particular touch screen locations are assigned to particular force sensors of the force sensor arrays, the method further comprising:
determining a force value associated with a user input in accordance with at least one force sensor assigned to a particular touch screen location when a touch input is received at the particular touch screen location.

12. The method of claim 11 further comprising:
determining whether the force value exceeds a predetermined threshold value for the location of the touch screen.

13. The method of claim 10 wherein:
the multiple items include multiple keys.

14. The method of claim 13 wherein the multiple keys include multiple virtual keys displayed on the touch screen.

* * * * *